(12) United States Patent
Kim et al.

(10) Patent No.: US 8,383,023 B2
(45) Date of Patent: Feb. 26, 2013

(54) MOLDING METHOD

(75) Inventors: Jin-ha Kim, Busan-si (KR); Seung Seob Lee, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 268 days.

(21) Appl. No.: 12/633,596

(22) Filed: Dec. 8, 2009

(65) Prior Publication Data

US 2011/0133360 A1    Jun. 9, 2011

(51) Int. Cl.
*B29C 33/28* (2006.01)
(52) U.S. Cl. .......................... 264/28; 264/221
(58) Field of Classification Search .................. 264/221, 264/28, 225
See application file for complete search history.

(56) References Cited

U.S. PATENT DOCUMENTS

| 4,454,081 A | 6/1984 | Soulier |
| 2002/0034013 A1 | 3/2002 | Nakamura et al. |
| 2002/0045285 A1* | 4/2002 | Ushijima et al. ............... 438/29 |

FOREIGN PATENT DOCUMENTS

GB    2 417 461    3/2006

OTHER PUBLICATIONS

Park et al, "Ice-lithographic fabrication of concave microwells and a microfluidic network", Aug. 2008, Biomed Microdevices (2009) 11:129-133.*
Darhuber et al., "Selective dip-coating of chemically micropatterned surfaces", Nov. 2000, Journal of Applied Sciences vol. 88 No. 9, p. 5119-5126.*
Australian Patent Office; International Search Report and Written Opinion in corresponding PCT application (PCT/KR2010/008454) mailed Feb. 18, 2011.

* cited by examiner

*Primary Examiner* — Galen Hauth
(74) *Attorney, Agent, or Firm* — Workman Nydegger

(57) ABSTRACT

A molding method may include forming a pattern on a surface of a substrate, the pattern and the surface of the substrate having an opposite polarity to each other, providing the substrate on which the pattern is formed with a liquid to form a liquid mold on either the surface of the substrate or the pattern, the liquid having a polarity identical to the polarity of the surface of the substrate or the polarity of the pattern and cooling the liquid mold at a temperature below a freezing point of the liquid to form a solid mold.

22 Claims, 7 Drawing Sheets

MOLDING METHOD

BACKGROUND

Generally, molding is a manufacturing process that involves shaping a pliable raw material using a rigid frame or mold. Molding is typically performed by contacting a target material with a surface of a mold, and transferring the shape of the mold surface to the target material. The target material is entirely or partially in a flowable state during a shaping process, and changed into a solid or at least a semi-solid state through the cooling or heating of the target material. The solid or semi-solid target material is then separated from the mold by various methods, such as cutting the target material from the mold, destroying the mold or introducing a release agent between the target material and the mold. Accordingly, the separation of the mold from the target material takes effort and time.

SUMMARY

Various embodiments of molding techniques and structures are disclosed herein. In an illustrative embodiment, a molding method includes forming a pattern on a surface of a substrate, the pattern and the surface of the substrate having an opposite polarity to each other, providing the substrate on which the pattern is formed with a liquid to form a liquid mold on either the surface of the substrate or the pattern, the liquid having a polarity identical to the polarity of the surface of the substrate or the polarity of the pattern, and cooling the liquid mold at a temperature below a freezing point of the liquid to form a solid mold.

In another embodiment, a molding method includes forming a hydrophobic pattern on a hydrophilic surface of a substrate, providing hydrophilic liquid on the hydrophilic surface of the substrate and on the pattern to form a liquid mold on the hydrophilic surface of the substrate, and cooling the liquid mold at a temperature below a freezing point of the hydrophilic liquid to form a solid mold.

In still another embodiment, a structure includes a pattern formed on a surface of a substrate, the pattern and the surface of the substrate having an opposite polarity to each other, a liquid mold formed on either the pattern or the surface of the substrate, and a molding member formed on the liquid mold.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

As used herein, the term "polarity" refers to a polar property or a non-polar property. For example, a molecule may be "polar" as a result of polar bonds due to a difference in electronegativity, or as a result of an asymmetric arrangement of non-polar covalent bonds and non-bonding pairs of electrons. Further, a molecule may be "non-polar" because there is (almost) no polarity in the bonds or because of the symmetrical arrangement of polar bonds. For the purpose of description, when one of the surface of the substrate or the pattern has a polar property, such as a hydrophilic property, while the other has a non-polar property, such as a hydrophobic property, it will be referred to hereinafter that the pattern and the surface of the substrate have an opposite polarity to each other. Further, when both the surface of the substrate and the pattern have the polar property, such as the hydrophilic property or the non-polar property, such as the hydrophobic property, it will be referred to hereinafter that the pattern and the surface of the substrate have the same polarity.

Figure 1A:
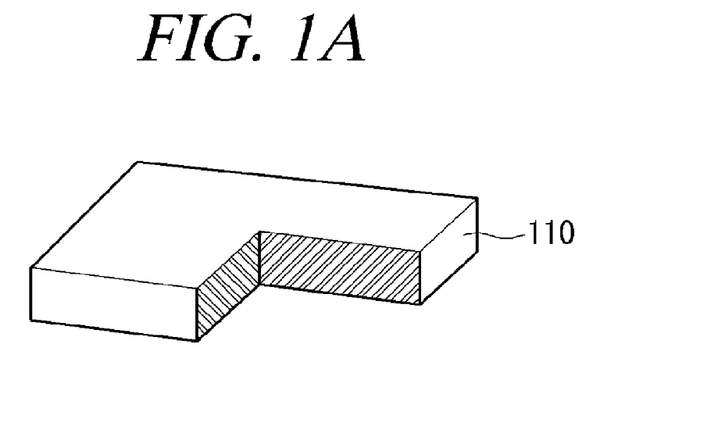
FIG. 1A to FIG. 1F show schematic diagrams of an illustrative embodiment of a molding method.

FIG. 1A to FIG. 1F show schematic diagrams of an illustrative embodiment of a molding method. As depicted in FIG. 1A, a substrate 110 may be prepared to function or serve as a base of a molding structure. In FIG. 1A to FIG. 1F, substrate 110 is shown in shape of a partial cut-out for illustrative purposes. Substrate 110 may include a material such as, but not limited to, glass, silicon, plastic, gallium arsenide or metal carbide, or any material having sufficient mechanical strength or hardness in a hot or cold environment.

Figure 1B:
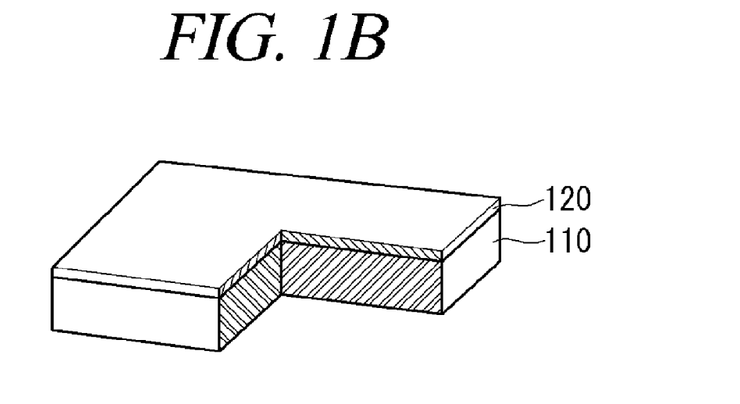

Referring to FIG. 1B, substrate 110 may have a surface 120 having a hydrophilic or hydrophobic property. An example embodiment in which hydrophilic surface 120 is formed on substrate 110 will be illustrated hereinafter for the purpose of description. However, one skilled in the art will appreciate that surface 120 of substrate 110 (also referred to interchangeably herein as hydrophilic surface 120) is not limited to having the hydrophilic property, and surface 120 having a hydrophobic property (also referred to interchangeably herein as hydrophobic surface 120) may be formed on substrate 110 in a substantially similar way as described hereinafter for hydrophilic surface 120.

In some embodiments, substrate 110 may be partially or entirely processed to have hydrophilic surface 120. For example, a hydrophilic material such as, but not limited to, silicon oxide, ceramic, glass or oxide-coated metal may be coated or deposited on substrate 110 to form hydrophilic surface 120 on substrate 110 by using any of a variety of well-known deposition or coating processes, such as spraying, spin coating, Chemical Vapor Deposition (CVD), Physical Vapor Deposition (PVD), or sputtering. Alternatively, if substrate 110 is made of silicon (Si), a thermal oxidation process can be performed on substrate 110 to form hydrophilic surface 120. Alternatively, if substrate 110 itself already includes the hydrophilic property, no additional process need be performed on substrate 110. In such a case, hydrophilic surface 120 already exists on substrate 110.

Figure 1C:
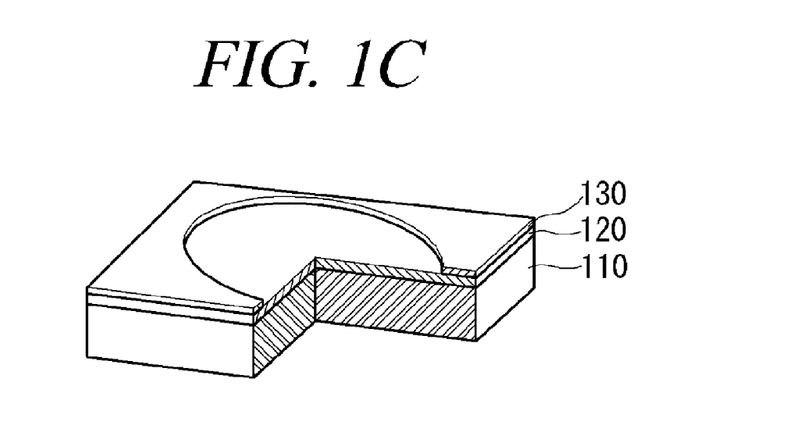

As depicted in FIG. 1C, a pattern 130 having a hydrophobic property may be formed on hydrophilic surface 120 of substrate 110 by using any of a variety of well-known patterning processes. For example, a photoresist (PR) material, which has a hydrophobic property, may be deposited on hydrophilic surface 120 of substrate 110. Substrate 110 having thereon hydrophilic surface 120, on which the photoresist (PR) material is deposited, is exposed to light, such as ultraviolet (UV) rays, through a mask having a pattern such as a circular shape. Substrate 110 exposed to light is developed in a developer solution such as Tetramethyl ammonium Chloride, or Tetramethyl ammonium hydroxide so that a part of the photoresist (PR) material exposed to light is removed. Accordingly, hydrophobic pattern 130 having a circular shape can be formed on hydrophilic surface 120 of substrate 110.

Although hydrophobic pattern 130 is illustrated to have a circular shape in FIG. 1C, it will be apparent to those skilled in the art that the pattern is not limited thereto but may be of any different shape and/or size.

Figure 1D:
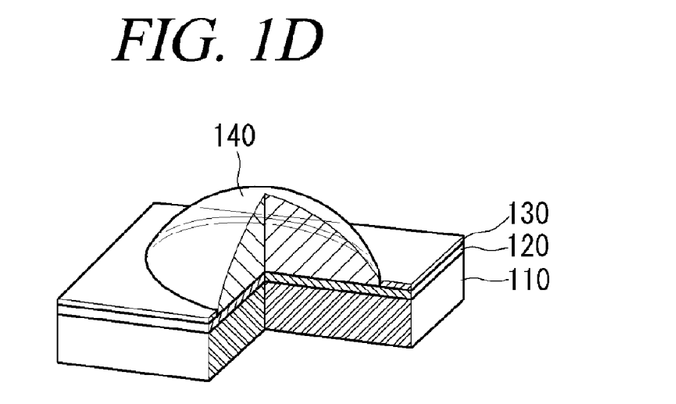

Referring to FIG. 1D, a hydrophilic liquid such as, but not limited to, water may be provided to substrate 110 on which hydrophobic pattern 130 is formed by immersing substrate 110 in the hydrophilic liquid or spraying the hydrophilic liquid on substrate 110. A material having a hydrophilic property or a hydrophobic property has a tendency to be combined with a material having the same property. Thus, the hydrophilic molecule of the hydrophilic liquid may be combined with the hydrophilic molecule of hydrophilic surface 120 of substrate 110 while not being combined with the hydrophobic molecule of hydrophobic pattern 130. Accordingly, a liquid mold 140 may be formed on hydrophilic surface 120 of substrate 110 using the hydrophilic-hydrophilic reaction, as described below.

In some embodiments where a liquid having the same property as that of pattern 130 is provided to surface 120 of substrate 110 and pattern 130, liquid mold 140 may be formed on pattern 130 instead of surface 120 of substrate 110. For example, a hydrophobic liquid is provided to hydrophilic surface 120 of substrate 110 and hydrophobic pattern 130, liquid mold 140 may be formed on hydrophobic pattern 130. Accordingly, one skilled in the art will appreciate that liquid mold 140 may be formed on either surface 120 of substrate 110 or pattern 130.

For example, liquid mold 140 may be formed on hydrophilic surface 120 of substrate 110 by immersing substrate 110 in the hydrophilic liquid and taking substrate 110 out from the hydrophilic liquid. Alternatively, liquid mold 140 may be formed on hydrophilic surface 120 of substrate 110 by spraying the hydrophilic liquid both on hydrophilic surface 120 of substrate 110 and on pattern 130. Alternatively, any method suitable to provide the hydrophilic liquid to substrate 110 and pattern 130 can be used without limitation. For example, these methods may include pouring the hydrophilic liquid to substrate 110 or allowing the hydrophilic liquid to flow on substrate 110.

Liquid mold 140, as depicted in FIG. 1D, may have a dome shape due to a surface tension applied to a surface of liquid mold 140. The surface tension is an attractive property of the surface of a liquid. For example, because of the surface tension of the hydrophilic liquid, hydrophilic molecules of the hydrophilic liquid readily gather to minimize a surface area of liquid mold 140. Thus, liquid mold 140 having a dome shape is formed on hydrophilic surface 120 of substrate 110.

Figure 1E:
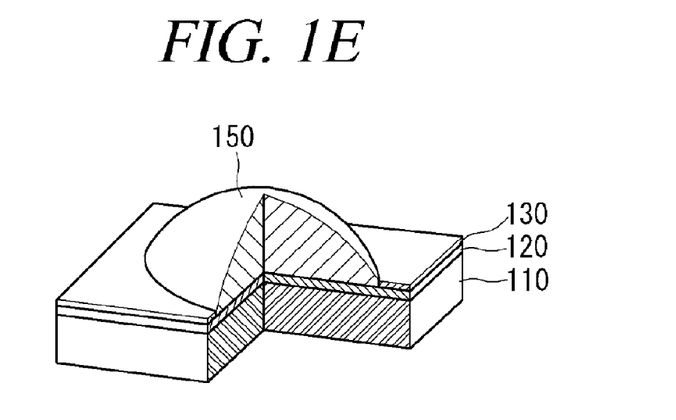

As depicted in FIG. 1E, liquid mold 140 may be cooled at a temperature below a freezing point of the hydrophilic liquid to form a solid-phase mold 150. Hereinafter, solid-phase mold 150 will be simply referred to as a "solid mold" for simplicity and ease of description. The freezing point may be varied depending on the type of the hydrophilic liquid used to form liquid mold 140. By way of example, if the hydrophilic liquid is water, liquid mold 140 is cooled at a temperature below zero to form solid mold 150 (for example, an ice mold).

Figure 1F:
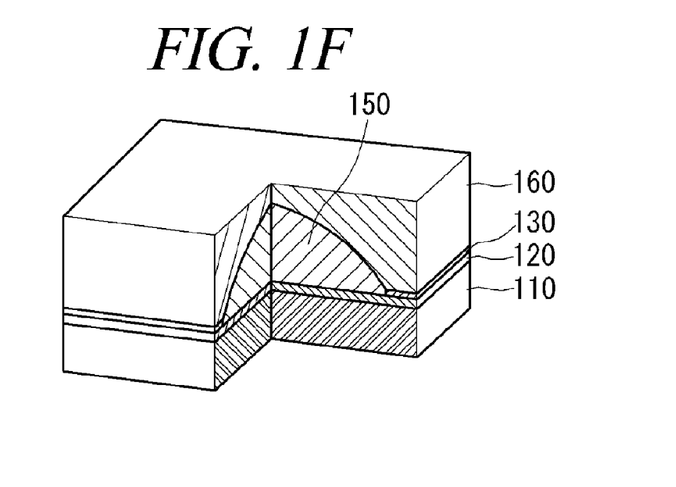

Referring to FIG. 1F, a molding material may be supplied on substrate 110 to cover solid mold 150 and pattern 130. The molding material may have a temperature lower than the freezing point of the hydrophilic liquid. If the temperature of the molding material is higher than the freezing point of the hydrophilic liquid, solid mold 150 that has frozen from the hydrophilic liquid may melt due to the heat transferred from the molding material. The molding material may include various kinds of polymers such as, but not limited to, Polydimethylsiloxane (PDMS), Epoxy, nylon, polyethylene or polystyrene. The molding material may be chosen based on the strength and function required for the final structure to be made using substrate 110, pattern 130, liquid mold 140 and solid mold 150. The molding material can have either a hydrophilic property or a hydrophobic property.

A heating process may be performed on substrate 110 on which the molding material has been supplied to cure the molding material. Accordingly, a molding member 160 composed of the molding material may be formed on pattern 130. During the heating process, solid mold 150 may also be heated and then melted into the hydrophilic liquid. The melted hydrophilic liquid may evaporate as the heating process is further developed. Accordingly, in order to reduce the evaporation rate of the hydrophilic liquid, an additive such as, but not limited to, glycerol having a concentration of about 5% can be added to the hydrophilic liquid.

In some embodiments, the heating process may be further continued until the hydrophilic liquid between substrate 110 and molding member 160 boils for a predetermined amount of time necessary to create a cavity between the hydrophilic liquid and molding member 160. If the hydrophilic liquid boils for a duration of time, the hydrophilic liquid may vaporize to a point where the volume of the vaporized hydrophilic liquid is larger than the volume of the liquefied hydrophilic liquid. If the hydrophilic liquid is cooled at a temperature below the boiling point thereof, the cavity is generated between the hydrophilic liquid and molding member 160 due to the volume difference between the vaporized hydrophilic liquid and the liquefied hydrophilic liquid.

In other embodiments, one or more openings may be formed in molding member 160 and/or substrate 110 by any of a variety of well-known methods such as, but not limited to, punching, etching, or cutting. The hydrophilic liquid melted from solid mold 150 may be discharged through the opening formed in molding member 160 and/or substrate 110. Alternatively, the hydrophilic liquid melted from solid mold 150 can also be discharged by removing substrate 110 and/or pattern 130. For example, substrate 110 and/or pattern 130 can be removed from molding member 160 by etching substrate 110 and/or pattern 130 while not etching molding member 160, cutting substrate 110 and/or pattern 130 from molding member 160, or introducing a release agent between substrate 110 and molding member 160 or between pattern 130 and molding member 160. Accordingly, molding member 160 may be separated from substrate 110, and molding member 160 may be used for various purposes.

Although FIG. 1A to FIG. 1F illustrates surface 120 of substrate 110 having a hydrophilic property and pattern 130 having a hydrophobic property, it will be apparent to those skilled in the art that surface 120 of substrate 110 may have a hydrophobic property and pattern 130 may have a hydrophilic property. In this case, the hydrophilic molecule of the hydrophilic liquid may be combined with the hydrophilic molecule of hydrophilic pattern 130, thus causing the hydrophilic liquid to readily accumulate on hydrophilic pattern 130. Since the hydrophilic molecule of the hydrophilic liquid may not be combined with the hydrophobic molecule of hydrophobic surface 120 of substrate 110, the hydrophilic liquid may not be accumulated on hydrophobic surface 120.

Further, although FIG. 1A to FIG. 1F illustrates the hydrophilic liquid being provided on hydrophilic surface 120 of substrate 110 and hydrophobic pattern 130, it will also be apparent to those skilled in the art that a hydrophobic liquid, rather than the hydrophilic liquid, can be supplied on hydrophilic surface 120 of substrate 110 and hydrophobic pattern 130. In this case, the hydrophobic molecule of the hydrophobic liquid may be combined with the hydrophobic molecule of hydrophobic pattern 130, thus causing the hydrophobic liquid to readily accumulate on hydrophobic pattern 130. Since the molecule of the hydrophobic liquid may not be combined with the hydrophilic molecule of hydrophilic surface 120 of substrate 110, the hydrophobic liquid may not be accumulated on hydrophilic surface 120. Still further, in the case where hydrophilic pattern 130 is formed on hydrophobic surface 120 of substrate 110, the hydrophobic molecule of the hydrophobic liquid may be combined with the hydrophobic molecule of hydrophobic surface 120 of substrate 110, thus causing the hydrophobic liquid to readily accumulate on hydrophobic surface of substrate 110 and not on hydrophilic pattern 130.

Figure 2A:
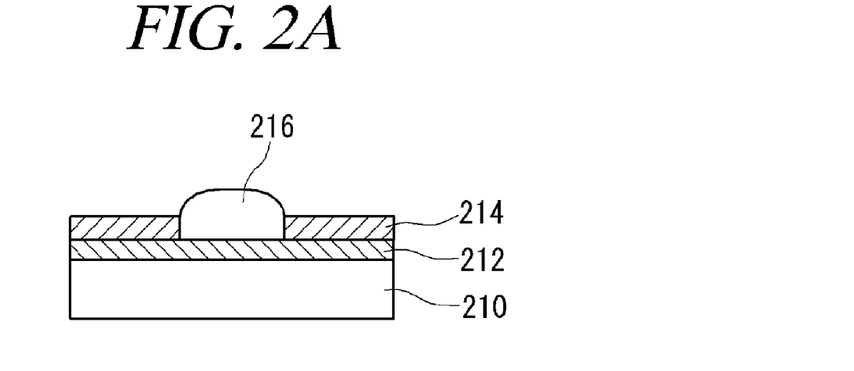
FIG. 2A to FIG. 2C show cross-sectional views of illustrative embodiments of a liquid mold.
Figure 2B:
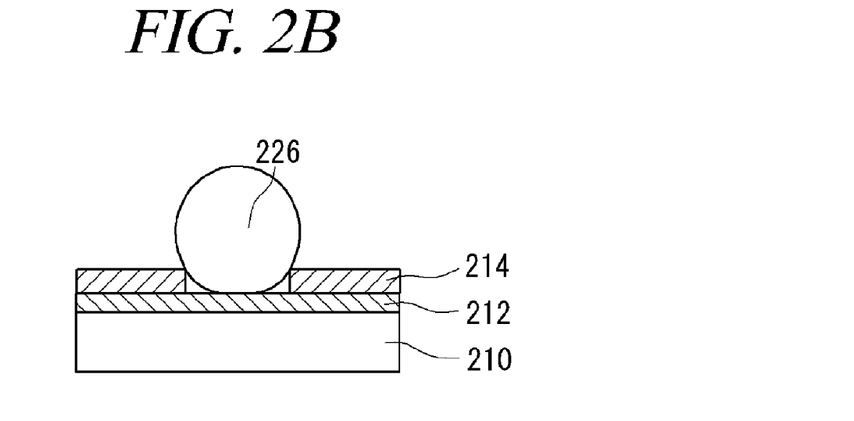
Figure 2C:
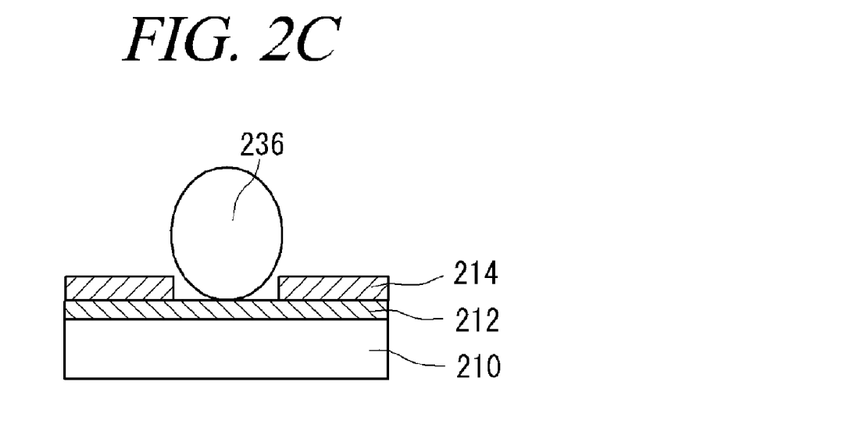

FIG. 2A to FIG. 2C show cross-sectional views of illustrative embodiments of a liquid mold. In FIGS. 2A to 2C, a reference numeral 210 represents a substrate, a reference numeral 212 represents a surface of the substrate, a reference numeral 214 represents a pattern, and reference numerals 216, 226, 236 each represent a liquid mold. Substrate 210, surface 212, and pattern 214 are composed of materials substantially similar to those for substrate 110, surface 120, and pattern 130, respectively, and can be formed in a manner substantially similar to that of substrate 110, surface 120, and pattern 130. Thus, redundant descriptions thereof will be omitted herein for the simplicity of description. A shape, a height and a size of liquid mold 216, 226, or 236 can be varied depending on, for example, a viscosity of a liquid, a dipole moment of the liquid, a dipole moment of surface 212 of substrate 210, or a dipole moment of pattern 214. Accordingly, by adjusting at least one of the viscosities of the liquid, the dipole moment of the liquid, the dipole moment of surface 212 of substrate 210, and the dipole moment of pattern 214, the shape, height and size of liquid mold 216, 226, or 236 can be controlled.

By way of example, as the viscosity of the liquid increases, a contact area between liquid mold 216, 226, or 236 and surface 212 of substrate 210 may become smaller while the height of liquid mold 216, 226, or 236 may become higher as shown in FIG. 2A to FIG. 2C. For example, as depicted in FIGS. 2A and 2B, the contact area between liquid mold 226 and surface 212 of substrate 210 is smaller than the contact area between liquid mold 216 and surface 212 of substrate 210 because the viscosity of the liquid for liquid mold 226 is greater than that of the liquid for liquid mold 216.

Further, as depicted in FIGS. 2B and 2C, if a difference between the dipole moment of surface 212 of substrate 210 of FIG. 2B and that of pattern 214 of FIG. 2B is larger than a difference between the dipole moment of surface 212 of substrate 210 of FIG. 2C and that of pattern 214 of FIG. 2C, liquid mold 236 may have a more circular shape than liquid mold 226.

Figure 3A:
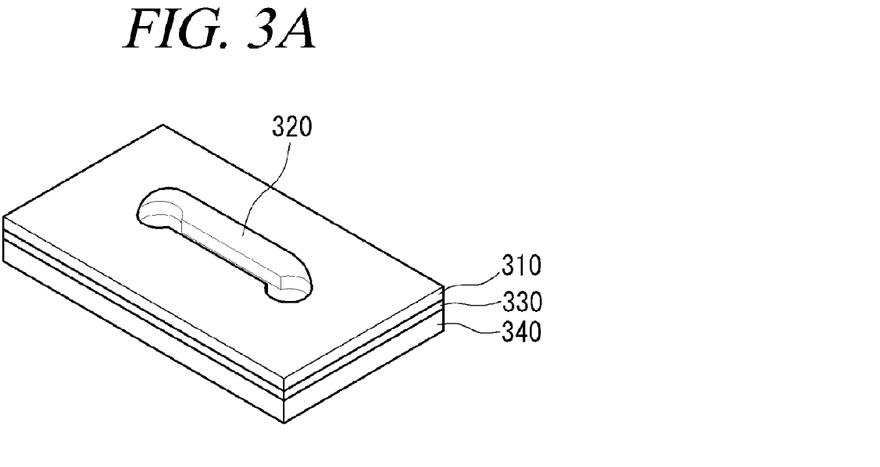
FIG. 3A shows a perspective view of a further illustrative embodiment of a liquid mold.
Figure 3B:
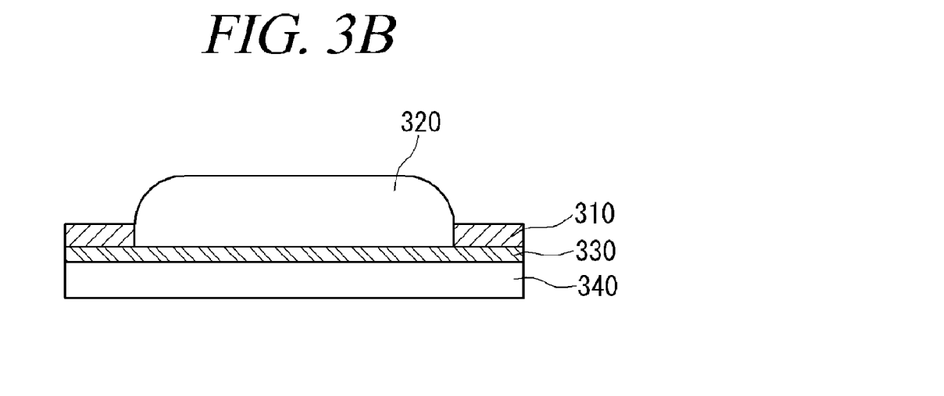
FIG. 3B shows a cross-sectional view of the liquid mold shown in FIG. 3A.

FIG. 3A shows a perspective view of a further illustrative embodiment of a liquid mold and FIG. 3B shows a cross-sectional view of the liquid mold shown in FIG. 3A. A reference numeral 340 represents a substrate, a reference numeral 330 represents a surface of the substrate, a reference numeral 310 represents a pattern, and a reference numeral 320 represents a liquid mold. Since the material and forming process for substrate 340, surface 330, pattern 310, liquid mold 320 are similar to those of substrate 110, surface 120, pattern 130 and liquid mold 140 discussed above in conjunction with FIG. 1A to FIG. 1F, redundant descriptions thereof will be omitted herein for the simplicity of description. For example, hydrophobic pattern 310 having a suitable shape, such as a dumbbell shape shown in FIG. 3A can be formed on hydrophilic surface 330 of substrate 340 by using any of a variety of well-known patterning processes such as photo lithography, electron beam lithography, or ion beam lithography. Then, a hydrophilic liquid may be provided to substrate 340 by immersing substrate 340 in the hydrophilic liquid or spraying the hydrophilic liquid both on hydrophilic surface 330 of substrate 340 and on pattern 310 and thus liquid mold 320 having the dumbbell shape may be formed on hydrophilic surface 330 of substrate 340. The shape of liquid mold 320 may be varied depending on a shape of pattern 310.

Figure 4:
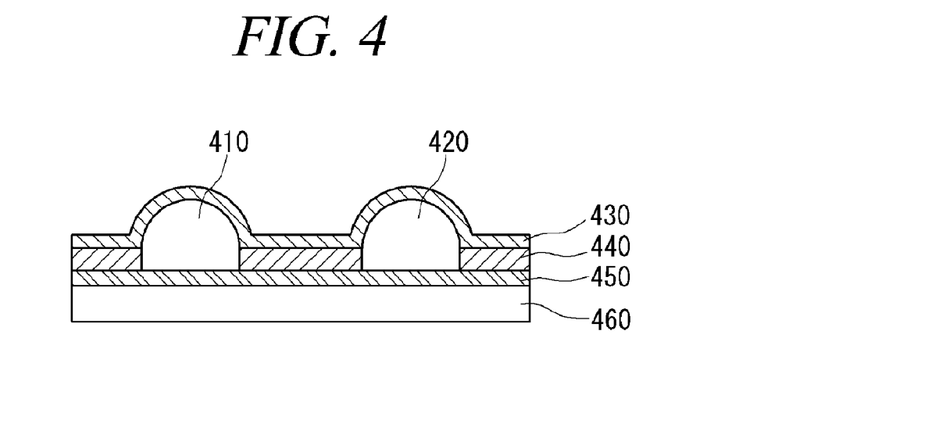
FIG. 4 shows a cross-sectional view of an illustrative embodiment of a molding member having a thin film shape.

FIG. 4 shows a cross-sectional view of an illustrative embodiment of a molding member having a thin film shape. Since the material and forming process of a substrate 460, a surface 450, a pattern 440 and two solid molds 410 and 420 are similar to those of substrate 110, surface 120, pattern 130 and solid mold 150 discussed above in conjunction with FIG. 1A to FIG. 1F, redundant descriptions thereof will be omitted herein for the simplicity of description. As depicted in FIG. 4, two solid molds 410 and 420 may be formed on surface 450 of substrate 460 and a molding member 430 may be formed on pattern 440 and on two solid molds 410 and 420.

In some embodiments, substrate 460 can be prepared to have two solid molds 410 and 420 by way of the method as described in paragraphs [0014] to [0023]. For example, hydrophobic pattern 440 having two circular shapes may be formed on hydrophilic surface 450 of substrate 460 through a mask having two circular shapes. Further, a hydrophilic liquid such as, but not limited to, water may be provided to substrate 460 on which hydrophobic pattern 440 is formed to form two liquid molds by immersing substrate 460 in the hydrophilic liquid or spraying the hydrophilic liquid both on hydrophilic surface 450 of substrate 460 and on pattern 440. And then, two solid molds 410 and 420 are formed by cooling the two liquid molds at a temperature below a freezing point of the hydrophilic liquid. Substrate 460 having two solid molds 410 and 420 may be rotated by a driving mechanism such as a motor at a high speed while supplying a molding material on both two solid molds 410 and 420 and pattern 440 in dribs and drabs, by way of various methods, such as but not limited to, spin coating. Because two solid molds 410 and 420 are in a solid-phase, rather than in a liquid-phase or a gaseous-phase, they can maintain their own shapes even if substrate 460 is rotated at a high speed. Therefore, the molding material can be supplied and evenly spread on both solid molds 410 and 420 and pattern 440 without affecting the shapes of solid molds 410 and 420. Because the supplying of the molding material is performed at the high speed, molding member 430 may have a thin film shape formed along two solid molds 410 and 420 and pattern 440.

In other embodiment, molding member 430 can be composed of a flexible material. In this case, the shape of molding member 430 may be modified by heating or cooling substrate 460 on which two solid molds 410 and 420 are formed. For example, if substrate 460 is heated at a temperature higher than a boiling point of solid molds 410 and 420, solid molds 410 and 420 may be melted into a liquid and the liquid may be boiled. Accordingly, the liquid may be vaporized in a short time so that molding member 430 may be expanded due to vapor or steam of the liquid. Therefore, the height and size of molding member 430 can be larger by the expansion of the volume of the vaporized liquid. To the contrary, if the heated liquid is cooled at a low temperature, the liquid may be condensed so that the height and size of molding member 430 may become smaller. Therefore, the shape of molding member 430 having a thin thickness can be controlled by heating or cooling substrate 460 at a certain temperature.

Figure 5A:
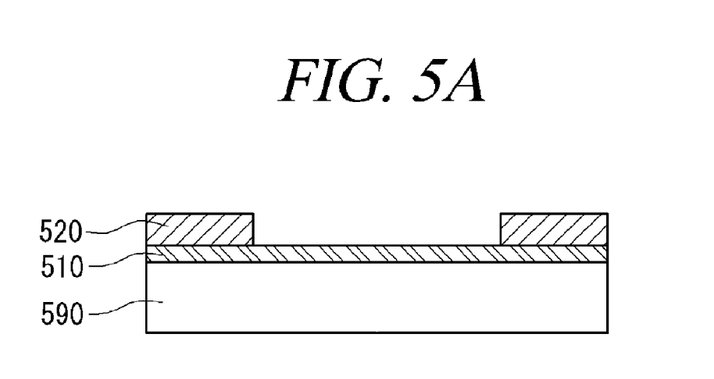
FIG. 5A to FIG. 5E show cross-sectional views of another illustrative embodiment of a molding method.
Figure 5B:
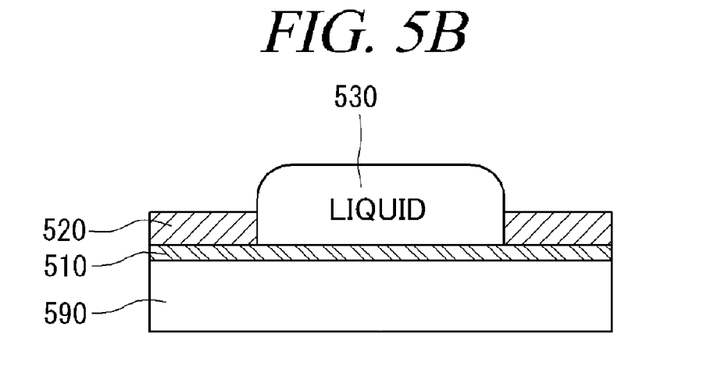
Figure 5C:
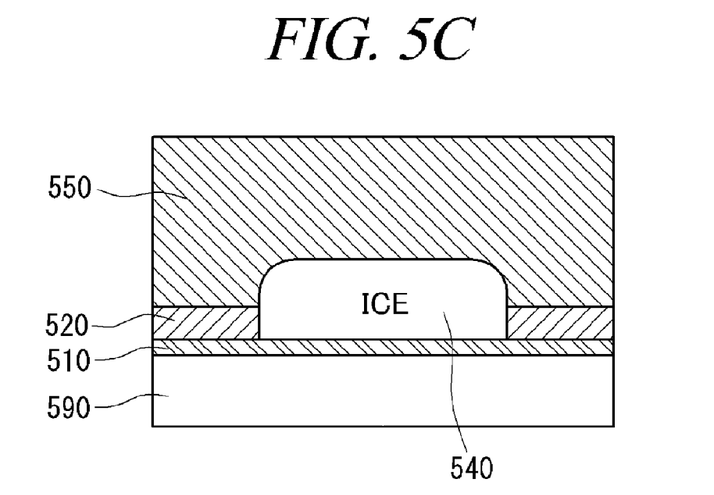

FIG. 5A to FIG. 5E show cross-sectional views of another illustrative embodiment of a molding method. Referring to FIG. 5A, a pattern 520 having a hydrophobic property may be formed on a hydrophilic surface 510 of a substrate 590 by way of the method as described in paragraph [0017] with reference to FIG. 1C. Then, a hydrophilic liquid may be provided to substrate 590 on which hydrophobic pattern 520 is formed so as to form a liquid mold 530 on hydrophilic surface 510 of substrate 590 by way of the method as described in paragraphs [0019] and [0021] with reference to FIG. 1D. Subsequently, liquid mold 530 may be cooled at a temperature below a freezing point of the hydrophilic liquid to form a solid mold 540 by way of the method as described in paragraph [0023] with reference to FIG. 1E. Thereafter, a molding material having a temperature, for example, lower than the freezing point of the hydrophilic liquid may be provided on pattern 520 and on solid mold 540 to form a molding member 550 by way of the method as described in paragraph [0024] with reference to FIG. 1F.

Figure 5D:
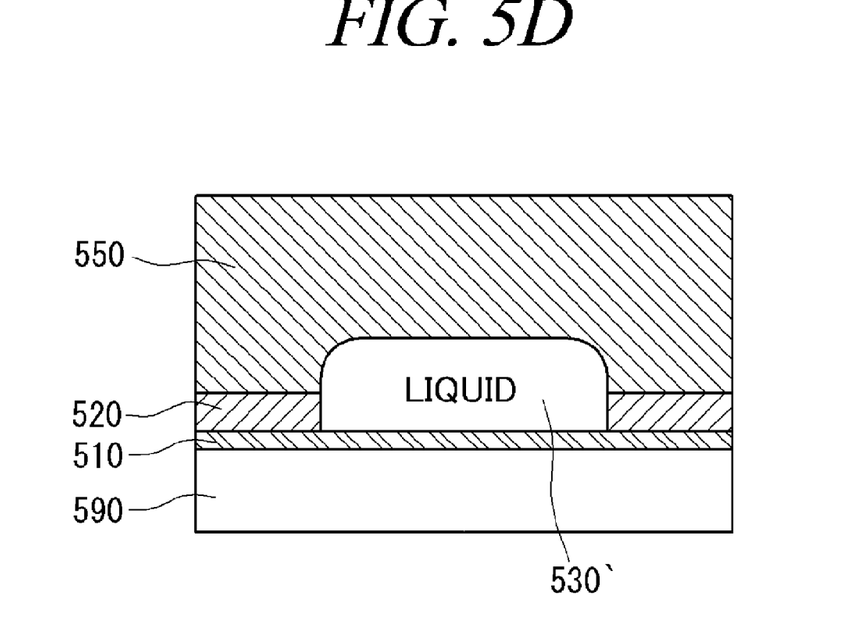

In FIG. 5D, solid mold 540 may be melted and returned into a hydrophilic liquid 530' by, for example, leaving a structure including substrate 590, solid mold 540 and the molding material used to form molding member 550 at a room temperature. Further, if necessary, the structure including the molding material may be heated further to cure the molding material.

Figure 5E:
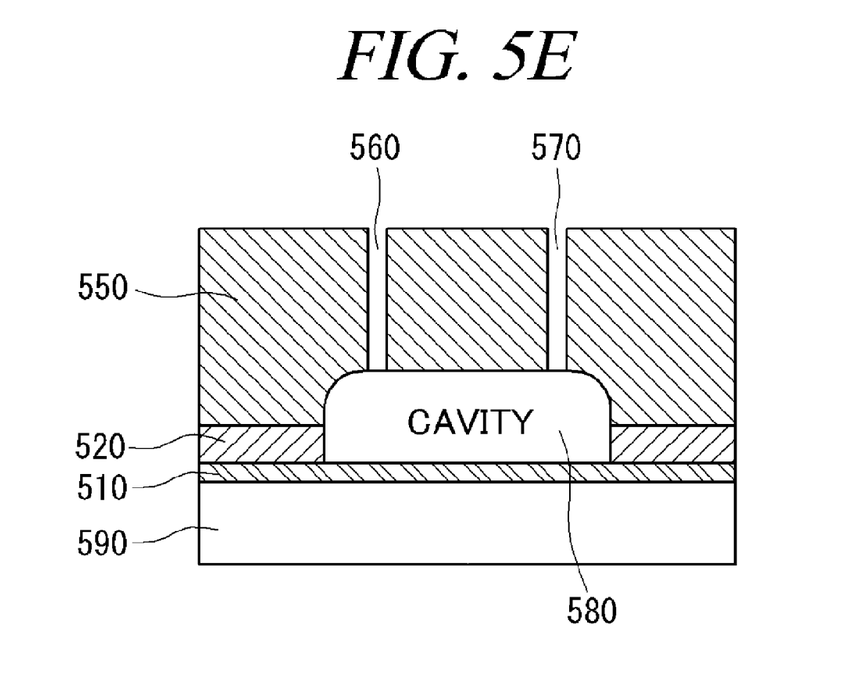

In FIG. 5E, two openings 560 and 570 may be formed in molding member 550 to discharge hydrophilic liquid 530' melted from solid mold 540 to an outside by way of the method as described in paragraph [0027]. Since hydrophilic liquid 530' can be readily removed through two openings 560 and 570, an empty space (for example, a cavity 580) may be formed where hydrophilic liquid 530' has been located. A structure including cavity 580 between substrate 590 and molding member 550 may be utilized as, but not limited to, a micro channel or a micro chamber. In some embodiments, forming openings 560 and 570 and removing hydrophilic liquid 530' are optional and may be omitted. In such a case, a structure including hydrophilic liquid 530' between substrate 590 and molding member 550 may be utilized as, but not limited to, a micro sensor or a micro actuator.

Although FIG. 5D and FIG. 5E illustrate two openings 560 and 570 formed in molding member 550, it will be apparent to those skilled in the art that two openings 560 and 570 can be formed in substrate 590 rather than in molding member 550 or in both of substrate 590 and molding member 550. Further, the number of openings and a shape of the openings can be varied depending on a final structure to be fabricated.

Figure 6:
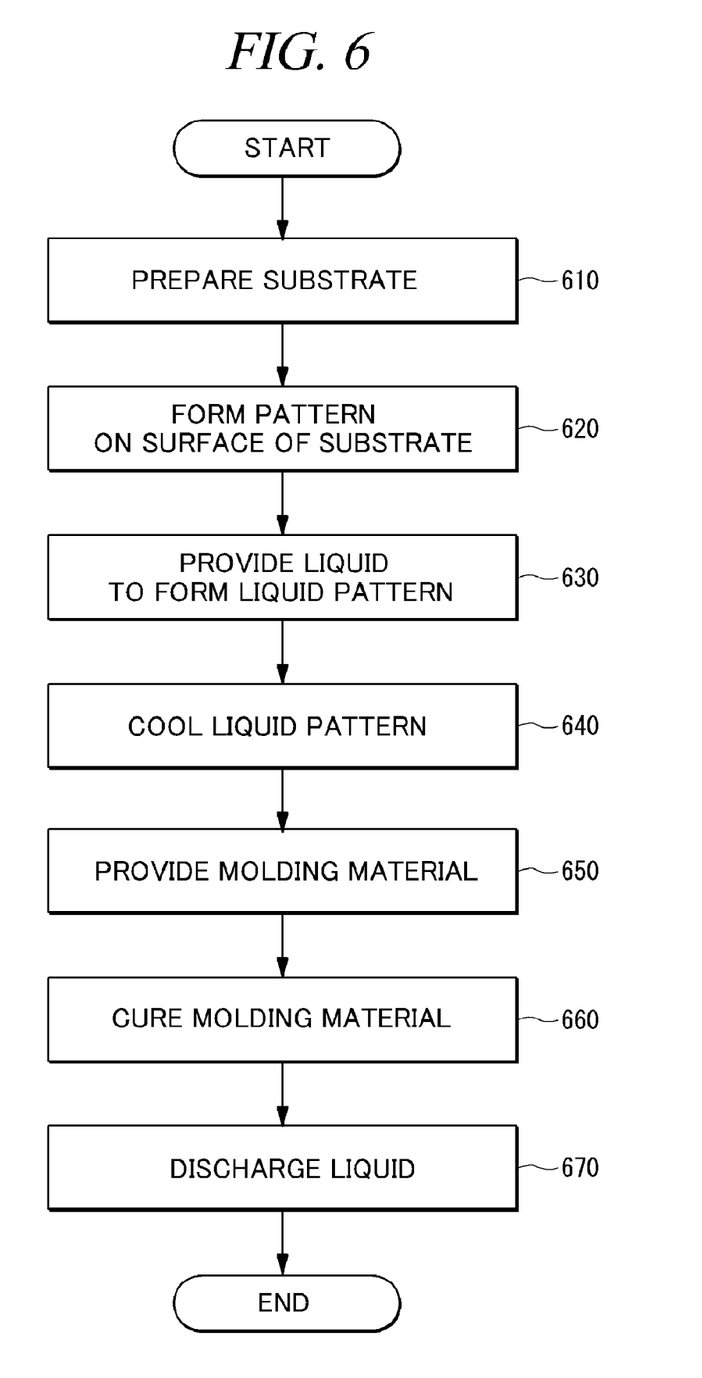
FIG. 6 is a flow diagram of an illustrative embodiment of a molding method.

FIG. 6 is a flow diagram of an illustrative embodiment of a molding method. A substrate may be prepared by a method similar to the method as described in paragraph [0014] with reference to FIG. 1A (block 610).

A pattern may be formed on a surface of the substrate by a method similar to the method as described in paragraph [0017] with reference to FIG. 1C (block 620).

A liquid may be provided to the substrate on which the pattern has been formed to form a liquid mold on either the surface of the substrate or the pattern by a method similar to the method as described in paragraphs [0019] and [0021] with reference to FIG. 1D (block 630). The pattern and the surface of the substrate may have an opposite polarity to each other. For example, one of the surface of the substrate or the pattern may have a polar property, such as a hydrophilic property while the other may have a non-polar property, such as a hydrophobic property. Further, the liquid may have a polarity identical to the polarity of the surface of the substrate or the polarity of the pattern. Thus, the liquid may have the same property as either the surface of the substrate or the pattern.

A material has a tendency to be combined with a material having the same property. Thus, the liquid mold may be formed on either the surface of the substrate or the pattern depending on their respective properties. By way of example, if the surface of the substrate is polar and the pattern is non-polar, a polar liquid may be accumulated on the polar surface of the substrate. On the contrary, if the surface of the substrate is non-polar and the pattern is polar, a polar liquid may be accumulated on the polar pattern.

Likewise, if the surface of the substrate is polar and the pattern is non-polar, a non-polar liquid is may be accumulated on the non-polar pattern. Further, if the surface of the substrate is non-polar and the pattern is polar, a non-polar liquid may be accumulated on the non-polar surface of the substrate.

The liquid mold may be cooled at a temperature below a freezing point of the liquid to form a solid mold by way of the method as described in paragraph [0023] with reference to FIG. 1E (block 640). The freezing point may be varied depending on the type of the liquid. As discussed in paragraph [0030] above, a shape of the liquid mold and the solid mold may be controlled by adjusting at least one of a viscosity of the liquid, a dipole moment of the liquid, a dipole moment of the surface of the substrate, and a dipole moment of the pattern.

A molding material having a temperature, for example, lower than the freezing point of the liquid may be provided on the substrate to cover both the solid mold and the pattern by way of the method as described in paragraph [0024] with reference to FIG. 1F (block 650). Then, the molding material may be cured to form a molding member by way of the method as described in paragraph [0025] (block 660).

The liquid melted from the solid mold may be discharged through an opening formed in the molding member and/or the substrate, and thus a cavity may be formed between the substrate and the molding member by way of the method as described in paragraphs [0026] and [0027] (block 670). Alternatively, the liquid melted from the solid mold can be discharged to an outside by removing the substrate and/or the pattern by way of the method as described in paragraph [0027]. Accordingly, the molding member can be separated from the substrate and the molding member may be used for various purposes. Meanwhile, the discharge of the liquid to the outside (block 670) is optional and may be omitted. In this case, a structure including the liquid between the substrate and the molding member may be used for other purposes.

Thus, a structure including the cavity between the substrate and the molding member may be used to fabricate, for example, a micro channel or a micro chamber. Otherwise, a structure including the liquid between the substrate and the molding member may be used for other applications, such as a micro sensor or a micro actuator. Still otherwise, the substrate and the pattern may be removed and the molding member may be used for various purposes.

Further, although FIG. 2A to FIG. 5E illustrate that liquid molds and solid molds are made of a hydrophilic or hydrophobic liquid, a liquid for the liquid molds and the solid molds is not limited to the hydrophilic or hydrophobic liquid and any liquid having a polar property, such as a hydrophilic property, or a non-polar property, such as a hydrophobic property, may be employed.

Furthermore, although FIG. 2A to FIG. 5E illustrate that each surface of a substrate or a patterns has a hydrophilic or hydrophobic property, a material used for each surface of the substrate or the pattern is not limited to have a hydrophilic or hydrophobic property, and any material having a polar property, such as a hydrophilic property, or a non-polar property, such as a hydrophobic property, may be employed.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a second third, middle third and first third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A molding method comprising:
    forming a pattern on a surface of a substrate, the pattern and the surface of the substrate having an opposite polarity to each other;
    providing the substrate on which the pattern is formed with a liquid to form a liquid mold on either a surface of the substrate or a surface of the pattern, the liquid having a polarity identical to the polarity of the surface of the substrate or the polarity of the pattern;
    cooling the liquid mold at a temperature below a freezing point of the liquid to form a solid mold;
    providing a molding material on the solid mold; and
    heating the molding material and/or the substrate at a temperature greater than a boiling point of the liquid.

2. The method of claim 1, wherein providing a molding material on the solid mold includes providing the molding material having a temperature less than the freezing point of the liquid.

3. The method of claim 2, further comprising:
    heating the molding material and the solid mold to cure the molding material and to melt the solid mold into the liquid.

4. The method of claim 3, further comprising:
    discharging the liquid melted from the solid mold through an opening formed in the cured molding material and/or in the substrate.

5. The method of claim 1, further comprising:
    removing the substrate and/or the pattern.

6. The method of claim 1, wherein a shape of the liquid mold is controlled by adjusting at least one of a viscosity of the liquid, a dipole moment of the liquid, a dipole moment of the surface of the substrate and a dipole moment of the pattern.

7. The method of claim 1, wherein the surface of the substrate has either a hydrophilic property or a hydrophobic property and the pattern has an opposite property to the property of the surface of the substrate.

8. The method of claim 7, wherein the liquid is hydrophilic.

9. The method of claim 8, wherein the hydrophilic liquid is water.

10. The method of claim 2, wherein the molding material is supplied by spin coating to form a thin film on the solid mold.

11. The method of claim 1, wherein the pattern is made of a photoresist patterned by photolithography.

12. The method of claim 1, wherein the liquid is provided by spraying the liquid on the surface of the substrate and on the pattern.

13. The method of claim 1, wherein the liquid is provided by immersing the substrate in the liquid.

14. A molding method comprising:
    forming a hydrophobic pattern on a hydrophilic surface of a substrate;
    providing hydrophilic liquid on the hydrophilic surface of the substrate and on the pattern to form a liquid mold on the hydrophilic surface of the substrate;
    cooling the liquid mold at a temperature below a freezing point of the hydrophilic liquid to form a solid mold;
    providing, on the solid mold and the pattern, a molding material; and
    curing the molding material by heating the molding material at a temperature greater than a boiling point of the hydrophilic liquid.

15. The method of claim 14, further comprising:
    providing, on the solid mold and the pattern, the molding material having a temperature less than the freezing point of the hydrophilic liquid.

16. The method of claim 14, wherein the substrate is made of silicon and the surface of the substrate is processed by thermal oxidation.

17. The method of claim 14, further comprising:
    discharging the hydrophilic liquid melted from the solid mold through an opening formed in the cured molding material and/or in the substrate.

18. The method of claim 15, wherein the molding material is supplied by spin coating to form a thin film on the solid mold.

19. A molding method comprising:
    forming a pattern on a surface of a substrate, the pattern and the surface of the substrate having an opposite polarity to each other;
    providing the substrate on which the pattern is formed with a liquid to form a liquid mold on either a surface of the substrate or a surface of the pattern, the liquid having a polarity identical to the polarity of the surface of the substrate or the polarity of the pattern;
    cooling the liquid mold at a temperature below a freezing point of the liquid to form a solid mold;
    providing a molding material on the solid mold; and
    heating the substrate and/or the molding material effective to at least partially vaporize the liquid to control a shape of the molding material.

20. The molding method of claim 19, further comprising forming at least one opening in the substrate and/or the molding material, the at least one opening effective to discharge the liquid.

21. A molding method comprising:
    forming a pattern on a surface of a substrate, the pattern and the surface of the substrate having an opposite polarity to each other;
    providing the substrate on which the pattern is formed with a liquid to form a liquid mold on either a surface of the substrate or a surface of the pattern, the liquid having a polarity identical to the polarity of the surface of the substrate or the polarity of the pattern;
    cooling the liquid mold at a temperature below a freezing point of the liquid to form a solid mold;
    providing a molding material on the solid mold; and
    cooling the substrate and/or the molding material effective to condense the liquid to control the shape of the molding material.

22. The molding method of claim 21, further comprising forming at least one opening in the substrate and/or the molding material, the at least one opening effective to discharge the liquid.

* * * * *

UNITED STATES PATENT AND TRADEMARK OFFICE
CERTIFICATE OF CORRECTION

PATENT NO. : 8,383,023 B2  Page 1 of 1
APPLICATION NO. : 12/633596
DATED : February 26, 2013
INVENTOR(S) : Kim et al.

It is certified that error appears in the above-identified patent and that said Letters Patent is hereby corrected as shown below:

On the Title Page, in Item (56), under "OTHER PUBLICATIONS", in Column 2, Line 1, delete "al," and insert -- al., --, therefor.

On the Title Page, in Item (56), under "OTHER PUBLICATIONS", in Column 2, Line 5, delete "Sciences vol. 88 No. 9," and insert -- Sciences, Vol. 88, No. 9, --, therefor.

Signed and Sealed this
Eighteenth Day of June, 2013

Teresa Stanek Rea
*Acting Director of the United States Patent and Trademark Office*